United States Patent
Kim et al.

(10) Patent No.: US 10,812,248 B1
(45) Date of Patent: Oct. 20, 2020

(54) CONTROLLING CARRIER-AGGREGATION SERVICE BASED ON CONNECTED-MODE DEVICE COUNT AND AIR-INTERFACE RESOURCE UTLIZATION

(71) Applicant: Sprint Spectrum L.P., Overland Park, KS (US)

(72) Inventors: Yun Sung Kim, Ashburn, VA (US); Jason P. Sigg, Overland Park, KS (US); Sanghoon Sung, Ashburn, VA (US); Pinalkumari Tailor, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/257,448

(22) Filed: Jan. 25, 2019

(51) Int. Cl.
| | |
|---|---|
| *H04L 5/00* | (2006.01) |
| *H04W 76/27* | (2018.01) |
| *H04W 72/08* | (2009.01) |
| *H04B 7/0452* | (2017.01) |
| *H04W 72/12* | (2009.01) |

(52) U.S. Cl.
CPC ......... *H04L 5/0098* (2013.01); *H04B 7/0452* (2013.01); *H04L 5/001* (2013.01); *H04W 72/085* (2013.01); *H04W 76/27* (2018.02); *H04W 72/1289* (2013.01)

(58) Field of Classification Search
CPC ...... H04L 5/0098; H04L 5/001; H04W 76/27; H04W 72/085; H04W 72/1289; H04B 7/0452

USPC .......................................................... 370/329
See application file for complete search history.

(56) References Cited

U.S. PATENT DOCUMENTS

| | | | |
|---|---|---|---|
| 2015/0334733 A1* | 11/2015 | Ren ...................... | H04L 47/722 370/336 |
| 2016/0323889 A1* | 11/2016 | Jeon ..................... | H04W 76/36 |
| 2017/0041922 A1* | 2/2017 | Chen ..................... | H04L 47/365 |
| 2018/0027562 A1* | 1/2018 | Jeon .................. | H04W 72/0453 455/450 |
| 2019/0246359 A1* | 8/2019 | Yoon ..................... | H04B 17/318 |
| 2019/0280845 A1* | 9/2019 | Bedekar ................ | H04L 5/0075 |

* cited by examiner

*Primary Examiner* — Chi Tang P Cheng

(57) ABSTRACT

In accordance with the disclosure, when a base station is serving at least a threshold quantity of devices and the base station is allocating at least a threshold quantity of its air-interface resources per unit time, the base station will disable carrier-aggregation service, so as to help minimize or eliminate instances where the base station's carriers would be used as secondary component carriers for carrier-aggregation service and would not support MU-MIMO service. By disabling carrier-aggregation service in that scenario, air-interface resources that might otherwise have been used for secondary-component-carrier transmission without MU-MIMO service may then instead be available for use with MU-MIMO service, which may help to improve spectral efficiency.

17 Claims, 5 Drawing Sheets

CONTROLLING CARRIER-AGGREGATION SERVICE BASED ON CONNECTED-MODE DEVICE COUNT AND AIR-INTERFACE RESOURCE UTLIZATION

BACKGROUND

A wireless communication system typically includes a number of base stations that are configured to provide wireless coverage areas in which wireless communication devices (WCDs) such as cell phones, tablet computers, tracking devices, embedded wireless modules, and other wirelessly equipped communication devices, can operate. In turn, each base station could be coupled with a core network that provides connectivity with one or more transport networks, such as the public switched telephone network (PSTN) and/or the Internet for instance. With this arrangement, a WCD within coverage of the system could engage in air interface communication with a base station and could thereby communicate via the base station with various remote network entities or with other WCDs served by the base station.

Such a system could operate in accordance with a particular radio access technology, with air-interface communications from the base stations to WCDs defining a downlink or forward link and air-interface communications from the WCDs to the base stations defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each base station could be configured to provide service on one or more carrier frequencies or "carriers." Each carrier could be frequency division duplex (FDD), defining separate frequency channels for downlink and uplink communication, or time division duplex (TDD), defining a single frequency channel multiplexed over time between downlink and uplink use. Each frequency channel of a carrier may occupy a particular frequency bandwidth defining a range of frequency at a particular position (e.g., defined by a center frequency) in radio-frequency spectrum.

Further, on the downlink and uplink, each carrier could be structured to define various physical channels for carrying information between the base stations and WCDs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

When a WCD enters into coverage of a base station, the WCD could discover threshold strong coverage on one of the base station's carriers and could responsively engage in signaling to connect with the base station on that carrier and to attach or register for service if appropriate. The base station could then serve the WCD, coordinating use of the carrier's air-interface resources on an as-needed basis. For example, when the base station has data to transmit to the WCD, the base station could allocate particular downlink air-interface resources to carry that data and could accordingly transmit the data to the WCD on the allocated downlink resources. And when the WCD has data to transmit to the base station, the WCD could transmit to the base station an uplink resource request, the base station could responsively allocate particular uplink air-interface resources to carry the data, and the WCD could then transmit the data to the base station on the allocated uplink resources.

In addition, under certain radio access technologies, a base station may be able to serve a WCD concurrently on multiple carriers, to help increase the effective bandwidth and associated throughput available to the WCD. For instance, if a WCD is connected with a base station on a first carrier, the base station may add one or more second carriers to the WCD's connection and then serve the WCD on a combination of the first carrier and the second carrier(s).

In an example carrier-aggregation implementation, the carrier on which the WCD initially connects with the base station may be considered the WCD's primary component carrier (PCC), and if the base station adds one or more other carriers to the WCD's connection, each such additional carrier may be considered a secondary component carrier (SCC) with respect to service of the WCD. Further, when a base station serves the WCD on a PCC in combination with one or more SCCs, the PCC may be used for both downlink and uplink communications between the base station and the WCD, but each SCC may be used for just downlink communications, to supplement the data capacity of the PCC and to help increase the WCD's downlink throughput.

Thus, when the base station has data to transmit to the WCD, the base station may schedule that transmission on air-interface resources distributed across the WCD's PCC and one or more SCCs. Whereas, when the WCD has data to transmit to the base station, the base station may schedule that transmission on air interface resources on just the WCD's PCC.

OVERVIEW

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, a base station can engage in air interface communication concurrently on multiple different radio-frequency (RF) propagation paths, or MIMO "layers," with multiple layers occupying the same frequency resources (e.g., subcarriers and PRBs) as each other. To facilitate this, the base station could be equipped with a MIMO antenna array, comprising multiple transmit antennas and multiple receive antennas. By suitably weighting and precoding transmissions by particular antennas in the array, and through use of beamforming, the base station can then output spatially separate but concurrent transmissions for receipt by its served WCDs. Because these concurrent transmissions occupy the same frequency resources (e.g., subcarriers) as each other, MIMO can thereby provide "MIMO gain" representing an increase in the base station's spectral efficiency, and possibly helping to avoid or defer the need to add more spectrum.

To provide many such layers, the base station could be equipped with a massive-MIMO antenna array. While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer (e.g., to facilitate beamforming), the massive-MIMO antenna array might support on the order of 16 layers, which may facilitate concurrent service of 8 WCDs with 2 layers apiece or 16 WCDs with 1 layer apiece, among other possibilities.

MIMO service can be used in a "multi-user MIMO" (MU-MIMO) configuration to increase the data capacity of the air interface by allowing communications to a group of WCDs to use the same air-interface resources as each other. For instance, a base station can modulate data streams destined to each of the WCDs on the same PRBs as each other, and the base station could pre-code the transmissions on each path using weighted coefficients based on channel estimates from the WCDs in a manner that enables each WCD to remove cross-talk and receive its intended data. Further, the base station could beamform the transmissions respectively to each WCD to help physically separate the transmissions from each other.

In order to beamform MU-MIMO transmissions respectively to each such WCD in the MU-MIMO group, the base station may need to evaluate uplink transmission that the base station receives from the WCD, to determine a channel frequency response, an angle of arrival, and/or other information associated with the air-interface path between the base station and the WCD, so that the base station can use that information as a basis to configure downlink beamformed transmission to the WCD. For instance, the base station may compute channel frequency response by taking a fast Fourier transform (FFT) of an uplink Sounding Reference Signal (SRS) periodically transmitted by the WCD, and the base station may apply an algorithm to establish downlink beamforming weighting factors based on that channel frequency response and then use the established weighting factors to configure beamformed transmission to the WCD from various antennas of the base station's antenna array.

This evaluation of uplink transmission from the WCD to facilitate configuring downlink beamformed transmission from the base station may be frequency-dependent. In particular, the channel frequency response, angle of arrival, and/or other such information associated with the air-interface path between the base station and the WCD may vary from frequency to frequency, due to differences in refraction and/or other factors. Therefore, the process of configuring downlink beamforming to a WCD based on evaluation of uplink transmission from the WCD may work best where the WCD's uplink transmission is on the same carrier as the base station's downlink transmission. (Moreover, the process may work best where the carrier is a TDD carrier, with the same frequency channel being used for both downlink and uplink transmission.)

Yet this may be impractical or impossible with respect to a WCD's secondary component carrier in carrier-aggregation service. As noted above, when a base station provides a WCD with carrier-aggregation service on a PCC together with an SCC, the PCC may be used for downlink and uplink communication but the SCC may be used for just downlink communication (e.g., to help increase the WCD's downlink throughput). In that scenario, while the base station could use the WCD's uplink transmission on the WCD's PCC as a basis to configure downlink beamformed transmission to the WCD on the PCC, the base station could not use the WCD's uplink transmission on the SCC as a basis to configure downlink beamformed transmission to the WCD on the SCC—since the WCD would not provide uplink transmission on the SCC.

Consequently, while the base station might be able to include the WCD in a MU-MIMO group for service on the WCD's PCC, the base station may be unable to include the WCD in a MU-MIMO group for service on the WCD's SCC—because the base station may be unable to beamform to the WCD on the WCD's SCC.

Unfortunately, this could be a problem in a scenario where the base station has very high air-interface resource utilization across its multiple carriers and where the base station is serving many WCDs so that application of MU-MIMO service may be beneficial. In that scenario, the base station's inability to include a WCD in a MU-MIMO group on the carrier being used as the WCD's SCC would result in sub-optimal spectral efficiency on that carrier, since the air-interface resources that the base station allocates for data transmission to the WCD on that carrier could not be used concurrently for data transmission to one or more other WCDs.

The present disclosure provides a mechanism to help address this problem.

In accordance with the disclosure, when a base station is serving at least a threshold quantity of WCDs and the base station is allocating at least a threshold quantity of its air-interface resources per unit time, the base station will disable carrier-aggregation service, so as to help minimize or eliminate instances where the base station's carriers would be used as SCCs and would not support MU-MIMO service.

For instance, in that scenario, the base station could transition from a mode in which the base station would invoke carrier-aggregation service for its served WCDs in response to the occurrence of a carrier-aggregation trigger condition to a mode in which the base station would not invoke carrier-aggregation service for its served WCDs even when the carrier-aggregation trigger condition occurs. Further, the base station could discontinue any existing carrier-aggregation service for its served WCDs such as by stopping allocation of air-interface resources on SCCs and/or by reconfiguring each such WCD's connection to encompass just a single carrier.

By disabling carrier-aggregation service in that scenario, air-interface resources that might otherwise have been used for SCC transmission without MU-MIMO service may then instead be available for use with MU-MIMO service. This process could thus beneficially help improve spectral efficiency, which could be especially important when the base station is serving many WCDs and has high air-interface resource utilization.

In an example implementation of this process, for instance, the base station could regularly monitor its operational state to make a determination of whether the operational state includes (i) the base station serving at least a predefined threshold quantity of connected-mode WCDs and (ii) the base station allocating at least a predefined threshold quantity of air-interface resources per unit time. And at times when the determination is affirmative, the base station could responsively operate with carrier-aggregation service disabled. Whereas, at times when the determination is negative, the base station could responsively operate with carrier-aggregation service enabled.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
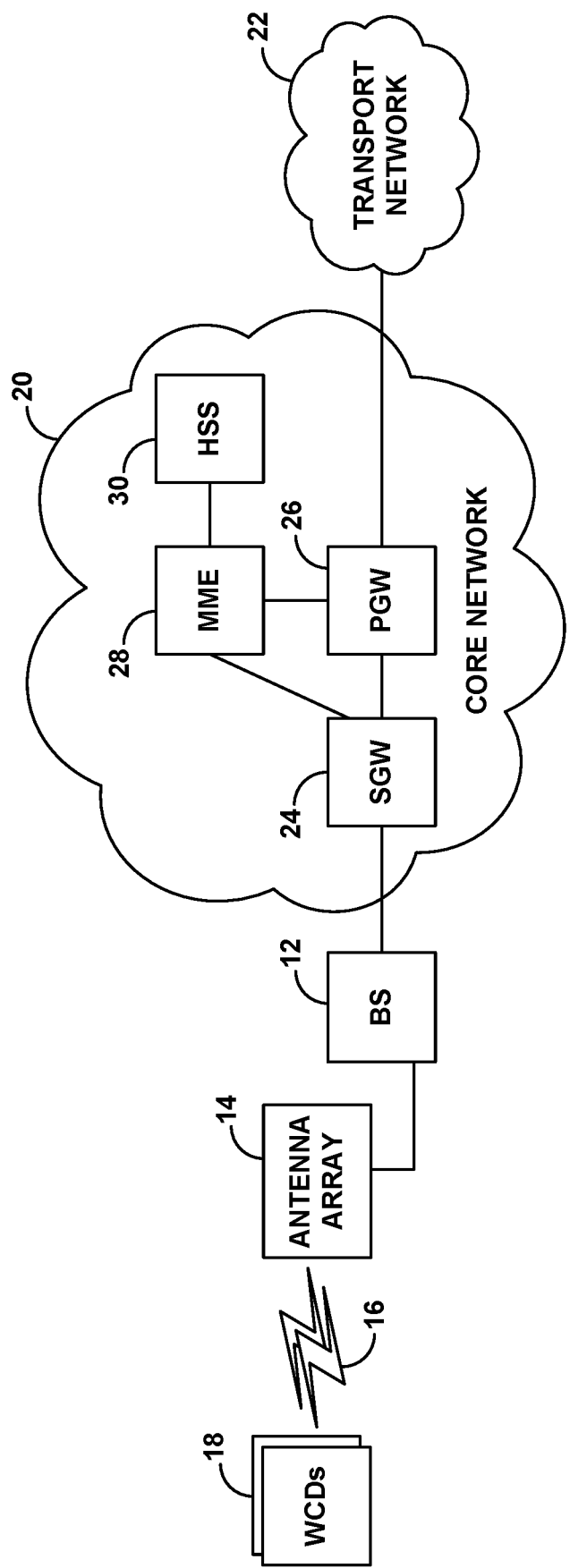
FIG. 1 is a simplified block diagram of a wireless communication system in which aspects of the present disclosure can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12 having an antenna array 14 through which the base station is configured to provide coverage on multiple carriers 16 in one or more frequency bands. Shown operating within coverage of the base station are then a plurality of WCDs 18, which could be devices of the type discussed above, among other possibilities.

The base station could be a macro base station of the type configured to provide a wide range of coverage, and the antenna array could be mounted on a tower or other tall structure. Alternatively, the base station could take other forms, such as a small cell base station, a relay, a femtocell base station, or the like, which might be configured to provide a smaller range of coverage. The base station could be configured to operate according to a 4G, 5G, or other radio access technology. For instance, the base station could be an LTE evolved Node-B (eNB) or a 5GNR gigabit Node-B (gNB), among other possibilities.

The base station is shown coupled with a core network 20, which could be an enhanced packet core (EPC) network, a next generation core (NGC) network, or another network including components supporting an applicable radio access technology and providing connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. In particular, the base station has an interface with the SGW, the SGW has an interface with the PGW, and the PGW provides connectivity with the transport network. Further, the base station has an interface with the MME, and the MME has interfaces with the SGW and the HSS.

With this arrangement, the SGW and PGW cooperatively provide user-plane connectivity between the base station and the transport network, to enable a WCD served by the base station to engage in communication on the transport network. And the MME operates as a controller to carry out operations such as coordinating WCD attachment and setup of user-plane bearers. Further, the HSS includes or has access to a data store containing WCD capabilities and service profile data and can work with the MME to facilitate WCD authentication.

Figure 2:
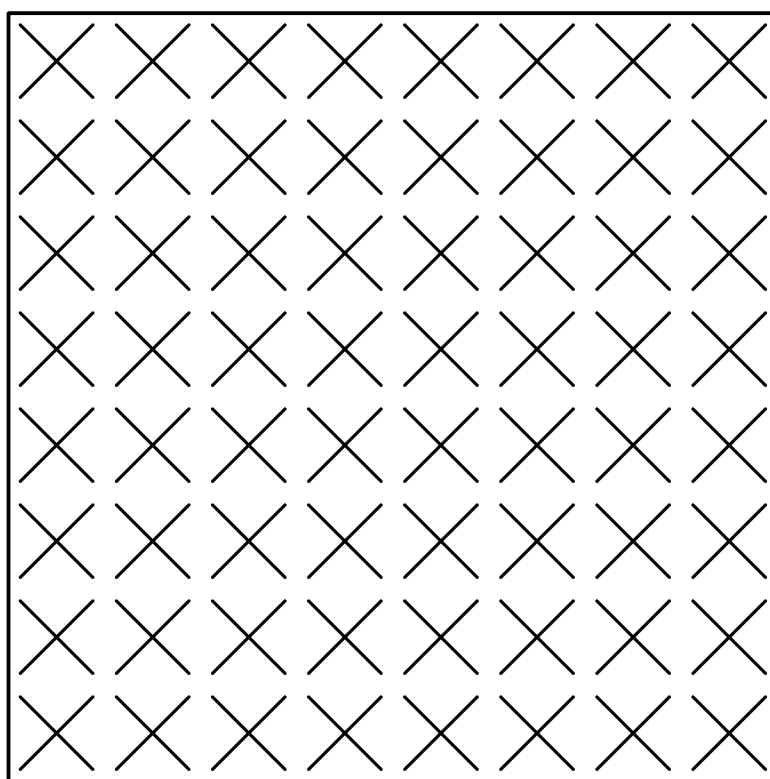
FIG. 2 is a simplified diagram of an example massive-MIMO antenna array that could be implemented according to the disclosure.

FIG. 2 is a simplified diagram of an example massive-MIMO array that could be implemented at base station 12. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs). Other MIMO arrangements are possible as well.

As discussed above, the air interface between the base station and WCDs within its coverage could be structured to define various air interface resources on each of the base station's carriers.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and WCDs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to WCDs. And other resource elements per subframe could be reserved to define a shared channel in which PRBs could carry scheduled data communications from the base station to WCDs.

Further, in certain subframes, a group of resource elements centered on the center frequency of each carrier could be reserved to carry synchronization signals that WCDs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that WCDs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from WCDs to the base station. And other resource elements per subframe could be reserved to define a shared channel in which PRBs could carry scheduled data communications from WCDs to the base station. Further, still other resources on the uplink could be reserved for other purposes as well. For instance, certain resource elements on the uplink could be assigned on a per-WCD basis to carry SRS transmission from the WCD to the base station, which the base station could use as a basis to compute channel frequency response, determine an angle of arrival, and so forth as discussed above.

In operation, when a WCD enters into coverage of the base station, the WCD could detect the base station's synchronization signal on one of the base station's carriers and could then read the base station's MIB or the like to determine that carrier's bandwidth, and the WCD could evaluate the base station's reference signal on that carrier to determine that coverage is strong enough to support a connection. The WCD could then engage in random access signaling and Radio Resource Control (RRC) configuration signaling with the base station to establish an RRC connection with the base station on that carrier, thus putting the WCD into a connected mode. (This connected mode can be distinguished from an idle mode, where the WCD does not have an RRC connection with the base station even if the WCD is operating within coverage of the base station.)

Once the WCD is so connected with the base station on one of the base station's carriers, the WCD could then transmit to the base station on that carrier an attach request, which the base station could forward to the MME for processing. And after working with the HSS to authenticate the WCD, the MME could coordinate setup for the WCD of one or more user-plane bearers between the base station and the PGW, to enable the WCD to engage in communication on the transport network. Further, the base station could establish for the WCD a context record indicating operational state of the WCD, including an indication of the carrier on which the WCD is connected, and the base station could receive from the WCD and/or the HSS (via the MME) a set of capabilities and profile data for the WCD and could store that data in the context record for reference while serving the WCD.

The base station could then serve the WCD with data communications.

For instance, when data arrives at the base station for transmission to the WCD, the base station could allocate one or more downlink PRBs on the WCD's serving carrier in an upcoming subframe for use to transmit at least a portion of the data, defining a transport block, to the WCD. The base station could then transmit to the WCD in the control region of that subframe a Downlink Control Information (DCI) message that designates the PRBs, and the base station could accordingly transmit the transport block to the WCD in those designated PRBs.

And when the WCD has data to transmit to the base station (e.g., for transmission on the transport network), the WCD could transmit to the base station on the carrier a scheduling request that carries with it a buffer status report (BSR) indicating how much data the WCD has buffered for transmission. And in response the base station, could allocate one or more uplink PRBs of the WCD's serving carrier in an upcoming subframe for use to transmit a transport block of that data from the WCD and could transmit to the WCD a DCI message that designates those upcoming PRBs. The WCD could then accordingly transmit the transport block to the base station in the designated PRBs.

While the base station is so serving a WCD on a given carrier, the WCD could also transmit various signals and information to the base station to assist with the base station's service of the WCD. For instance, as noted above, the WCD could periodically transmit an SRS, which the base station could use as a basis to evaluate the channel between the WCD and the base station in order to facilitate beamforming and/or for other purposes.

In addition, initially upon WCD connection or subsequently while the base station is serving the WCD on a given carrier, the base station could invoke carrier-aggregation service for the WCD. Various triggers could exist for invoking carrier aggregation. For instance, the base station could determine that the base station has a threshold great quantity of data buffered for transmission to the WCD and that it would therefore be useful to increase the WCD's downlink throughput by allowing data transmission to the WCD to be distributed across multiple carriers.

To invoke carrier-aggregation service for a WCD, the base station could engage in RRC signaling with the WCD to cause the WCD to scan for and report threshold strong coverage of the base station on one or more carriers, and upon reporting from the WCD, the base station could add one or more such carriers to the WCD's RRC connection as SCC(s). To add each such SCC, the base station could engage in RRC signaling with the WCD to notify the WCD that the carrier is added as a secondary component carrier, and the base station could accordingly update the WCD's context record.

The base station could then provide the WCD with carrier-aggregation service, for instance with WCD's initially serving carrier functioning as a PCC for the WCD and with each additional carrier in the WCD's connection functioning as an SCC for the WCD. In particular, when the base station has data for transmission to the WCD, the base station could allocate one or more downlink PRBs in the WCD's PCC and one or more PRBs in each of the WCD's one or more SCCs to cooperatively carry a transport block of the data to the WCD. And the base station could transmit to the WCD a DCI message that designates the PRBs and could accordingly transmit the transport block to the WCD in the designated PRBs, i.e., distributed across the WCD's PCC and SCC(s).

The base station may serve multiple connected WCDs at a time on each of the base station's various carriers, including serving some such WCDs with carrier aggregation and serving other such WCDs without carrier aggregation. Further, because the base station's air interface on each carrier has just a finite, limited number of PRBs per unit time (e.g., per subframe), the base station could implement a scheduling algorithm in an effort to fairly and appropriately allocate the PRBs among the served WCDs.

Yet even with such a scheduling algorithm, the base station may face load issues that make it difficult to meet subscriber communication needs. For instance, as noted above, there could be times when the base station is serving many WCDs and where the base station has threshold high PRB-utilization, both in total across the base station's carriers (and perhaps also on each individual carrier). In that situation, as noted above, it may be beneficial for the base station to apply MU-MIMO to help increase the base station's spectral efficiency.

As explained above, in such a scenario, the base station could beneficially disable carrier-aggregation service cooperatively across the base station's carriers, so as to minimize or eliminate use of the base station's carriers as SCCs that may not support beamforming for MU-MIMO service.

The act of the base station disabling carrier-aggregation service could involve the base station transitioning from operating in a first mode in which the base station is configured to invoke carrier-aggregation service when a carrier-aggregation trigger condition exists (e.g., as discussed above) to a second mode in which the base station is configured to not invoke carrier-aggregation service even if and when the carrier-aggregation trigger condition exists. For instance, in the first mode, if the base station detects that it has a threshold high quantity of data buffered for transmission to a WCD, the base station may responsively add one or more carriers to the WCD's connection to facilitate providing the WCD with carrier-aggregation service. But in the second mode, if the base station detects that it has the threshold high quantity of data buffered for transmission to the WCD, the base station may not responsively add one or more carriers to the WCD's connection and may not provide the WCD with carrier-aggregation service.

To facilitate this, the base station could store an indication of whether the base station is operating with carrier-aggregation service enabled or rather with carrier-aggregation service disabled. For instance, the base station could store a Boolean flag or other data as this indication, and the base station could dynamically toggle the indication based on whether the base station's operational state includes (i) the base station serving at least a threshold quantity of connected-mode WCDs and (ii) the base station allocating at least a threshold high quantity of air-interface resources per unit time.

Further, the act of the base station disabling carrier-aggregation service could involve the base station discontinuing application of currently configured carrier-aggregation service. For instance, to the extent the base station has one or more WCD connections that each encompass multiple carriers, the base station could forgo allocating air-interface resources on each SCC of each such connection and could limit air-interface allocation to be just on the PCC of each such connection. Alternatively, the base station could engage in RRC signaling with each such WCD to reconfigure the WCD's connection from encompassing multiple carriers to instead encompassing just a single carrier.

In operation of this process, the base station could regularly monitor how many connected-mode WCDs the base station is serving, such as with how many WCDs the base station has an established RRC connection. At issue could be whether this quantity of connected-mode WCDs is at least as high as a predefined threshold quantity. The predefined threshold quantity could be at least five connected-mode WCDs (and could thus be set to a value that is five or more). And the base station could be pre-programmed or otherwise provisioned with this threshold value to facilitate the process.

Likewise, the base station could regularly monitor the base station's rate of air-interface resource allocation. For instance, if the base station's carriers cooperatively define a certain quantity of PRBs (or other such air-interface resources) per unit time (e.g., per downlink subframe), at issue could be what percentage of those PRBs the base station is allocating per unit time. The base station could perform this evaluation over a sliding window of time, such as by determining an average percentage of PRBs allocated per subframe over the past frame or other recent duration. Or the base station could consider more instant data. To facilitate this analysis, the base station could keep a record of the number, percentage, and/or other count of its air-interface resource allocation per unit time. Further, this predefined quantity could be at least 70% (and could thus be set to a value that is 70% or more). And the base station could be pre-programmed or otherwise provisioned with this threshold value as well.

Note also that, since a technical rationale for disabling carrier-aggregation in this scenario may be to facilitate more MU-MIMO service, the base station could further condition its disabling of carrier-aggregation service on a determination that the base station has MU-MIMO service enabled—i.e., that the base station is currently configured to provide MU-MIMO service when appropriate. In an example implementation, for instance, there may be times or situations when the base station may have MU-MIMO service enabled and there may be other times or situations when the base station may MU-MIMO service disabled.

The base station's implementation of the present process may then involve the base station making a determination of whether its operational state includes (i) the base station serving at least a threshold quantity of connected-mode WCDs, (ii) the base station allocating at least a threshold high quantity of air-interface resources per unit time, and (iii) the base station having MU-MIMO service enabled. And when the determination is affirmative, the base station may responsively disable carrier-aggregation service and operate with carrier-aggregation service disabled. Whereas, when the determination is negative, the base station may responsively enable carrier-aggregation service and operate with carrier-aggregation service enabled.

Figure 3:
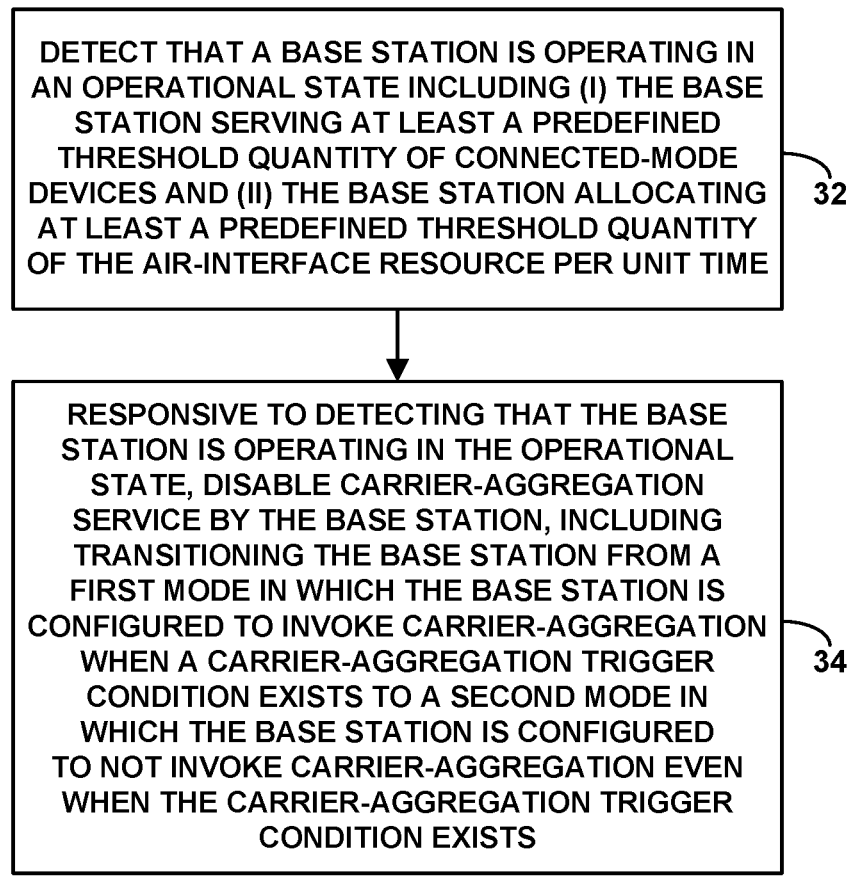
FIG. 3 is a flow chart depicting operations that can be carried out in accordance with the disclosure.

FIG. 3 is a flow chart depicting a method that can be carried out in accordance with this disclosure, to control carrier-aggregation service by a base station, the base station being configured to provide wireless communication service on each of a plurality of carriers, and the carriers cooperatively defining a plurality of air-interface resources per unit time. This method can be carried out by the base station or by one or more entities in communication with and/or control of the base station.

As shown in FIG. 3, at block 32, the method includes detecting that the base station is operating in an operational state including (i) the base station serving at least a predefined threshold quantity of connected-mode devices and (ii) the base station allocating at least a predefined threshold quantity of the air-interface resource per unit time. And at block 34, the method includes, responsive to detecting that the base station is operating in the operational state, disabling carrier-aggregation service by the base station, including transitioning the base station from a first mode in which the base station is configured to invoke carrier-aggregation when a carrier-aggregation trigger condition exists to a second mode in which the base station is configured to not invoke carrier-aggregation even when the carrier-aggregation trigger condition exists.

In line with the discussion above, this method can be carried out with respect to downlink service. Thus, the air-interface resources could be downlink PRBs, and each carrier could have has a respective frequency bandwidth divided into a respective quantity of the downlink PRBs per unit time. Further, as noted above, the predefined threshold quantity of connected-mode devices could be at least five, and the predefined threshold quantity of the air-interface resources per unit time could be at least 70% of the air-interface resources per downlink subframe.

As further discussed above, the act of invoking carrier-aggregation could involve reconfiguring a connection between the base station and a served connected-mode device from encompassing just a single carrier to encompassing multiple carriers.

Further, as discussed above, the act of disabling carrier-aggregation service could additionally include the base station discontinuing currently-configured carrier-aggregation service for one or more of the connected-mode devices. For instance, the act could include limiting scheduled transmission from the base station to each such connected-mode device to be on a primary component carrier of a connection between the base station and the connected-mode device and/or reconfiguring a connection between the base station and the connected-mode device from encompassing multiple carriers to encompassing just a single carrier.

Still further, in line with the discussion above, the act of transitioning the base station from the first mode to the second mode could involve storing in data storage of the base station an indication that the base station is operating in the second mode rather than in the first mode, where, per the indication, the base station does not invoke carrier-aggregation.

And as additionally discussed above, the operational state when the carrier-aggregation service will be disabled could further include the base station having MU-MIMO service enabled.

Figure 4:
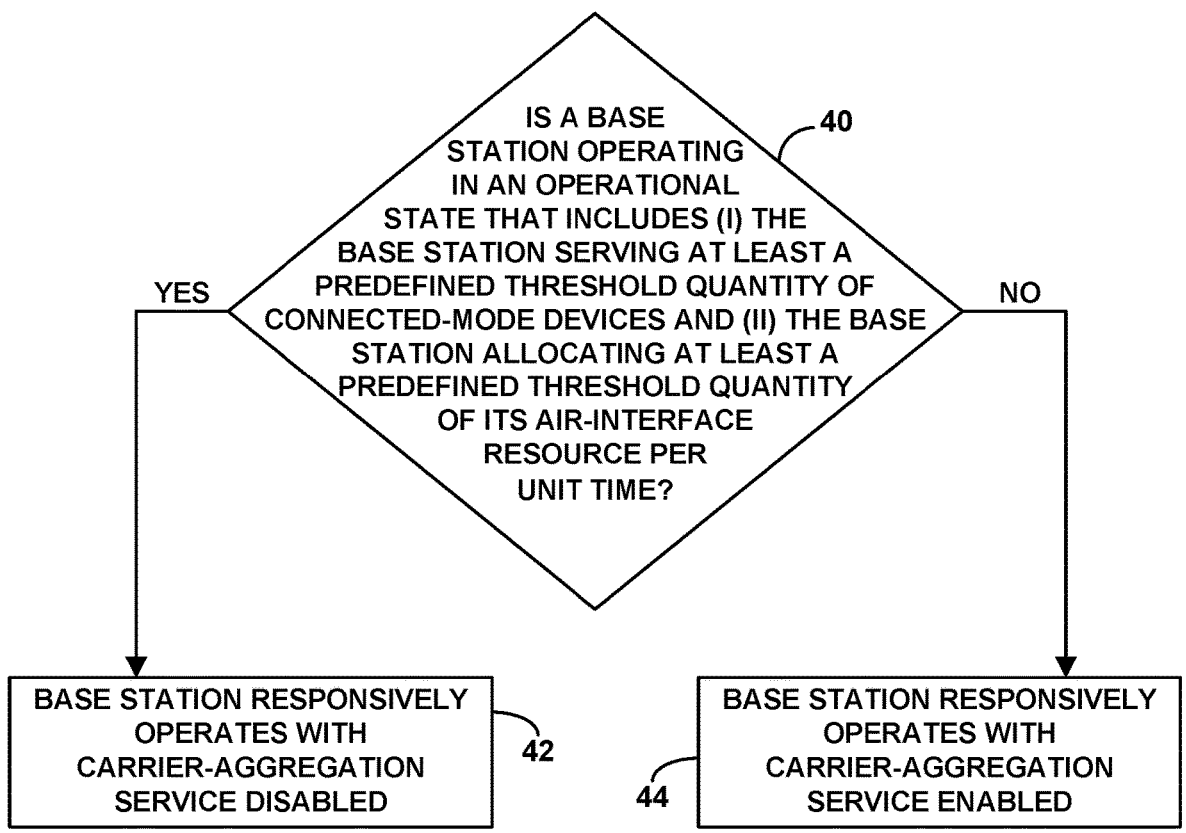
FIG. 4 is another flow chart depicting operations that can be carried out in accordance with the disclosure.

FIG. 4 is next another flow chart depicting a method that can be carried out in accordance with this disclosure, to control carrier-aggregation service by a base station, the base station being configured to provide wireless communication service on each of a plurality of carriers, and the carriers cooperatively defining a plurality of air-interface resources per unit time.

As shown in FIG. 4, at block 40, the method includes the base station making a determination of whether the base station is operating in an operational state that includes (i) the base station serving at least a predefined threshold quantity of connected-mode devices and (ii) the base station allocating at least a predefined threshold quantity of the air-interface resource per unit time. Further, the method includes the base station controlling, based on the determination, whether the base station operates with carrier-aggregation service enabled or rather disabled, the controlling including (a) if the determination is that the base station is operating in the operational state, then, at block 42, responsive to the determination, operating by the base station with carrier-aggregation service disabled and (b) if the determination is that the base station is not operating in the operational state, then, at block 44, responsive to the determination, operating by the base station with carrier-aggregation service enabled.

Various features described above can be implemented in this context as well, and vice versa.

For instance, the act of the base station operating with carrier-aggregation service enabled could involve the base station being configured to invoke carrier-aggregation when a carrier-aggregation trigger condition exists, and the act of the base station operating with carrier-aggregation service disabled could involve the base station being configured to not invoke carrier-aggregation service even when the carrier-aggregation-trigger condition exists. Further, the method could be carried out with respect to downlink service, and the predefined thresholds could be as described above, among other possibilities.

Still further, the act of controlling, based on the determination, whether the base station operates with carrier-aggregation service enabled or rather disabled could involve (i) if the determination is that the base station is operating in the operational state, then, responsive to the determination, the base station transitioning from operating with carrier-aggregation service enabled to operating with carrier-aggregation service disabled, whereas (ii) if the determination is that the base station is not operating in the operational state, then, responsive to the determination, transitioning by the base station from operating with carrier-aggregation service disabled to operating with carrier-aggregation service enabled. And as noted above, the base station could store in data storage an indication of whether the base station is operating with carrier-aggregation service enabled or rather with carrier-aggregation service disabled, and the base station could operate in accordance with the stored indication.

Figure 5:
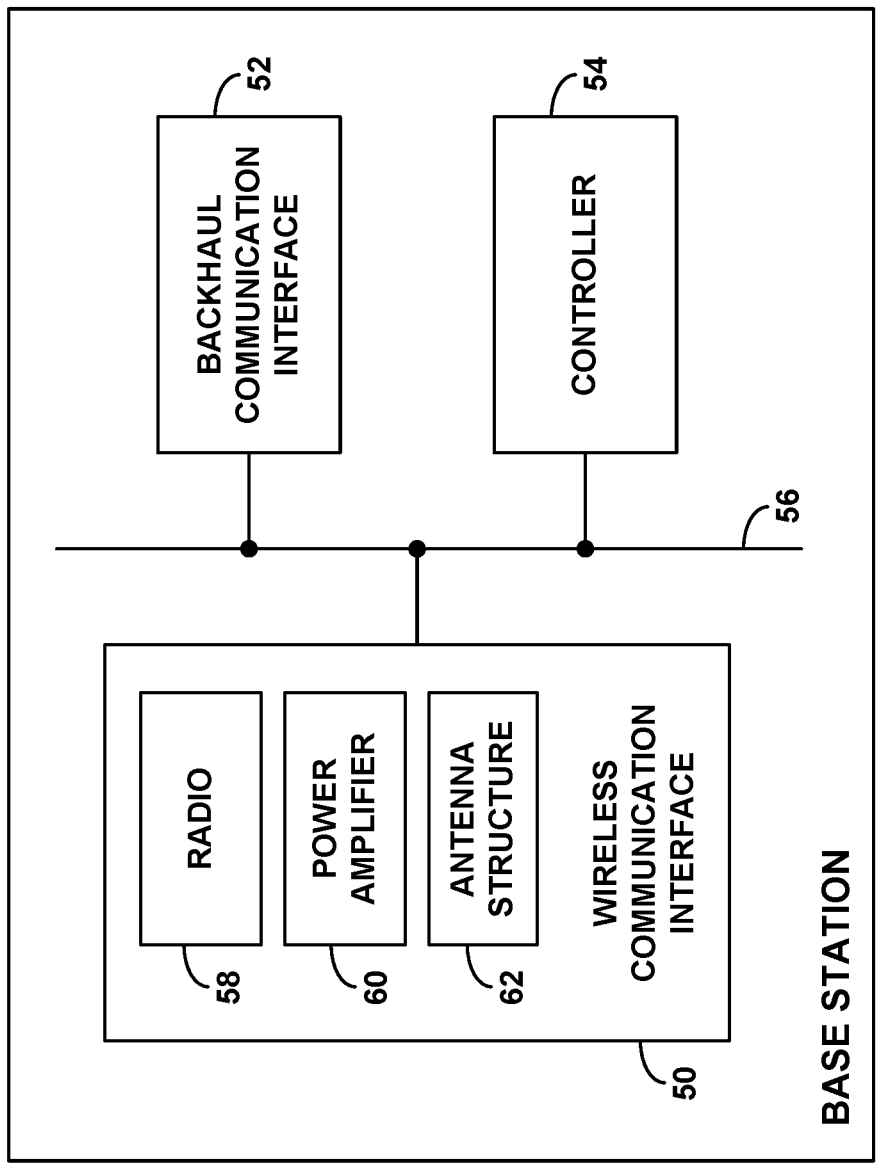
FIG. 5 is a simplified block diagram of a base station operable in accordance with the disclosure.

Finally, FIG. 5 is a simplified block diagram of an example base station that could operate in accordance with the present disclosure to control carrier-aggregation service over an air interface.

As shown in FIG. 5, the example base station includes a wireless communication interface 50, a backhaul communication interface 52, and a controller 54, which could be integrated together and/or communicatively linked by a network, system bus, or other connection mechanism 56.

Wireless communication interface 50 includes a radio 58, a power amplifier 60, and antenna structure 62. The radio could operate to interface between encoded baseband signals and RF signals. The power amplifier could operate to amplify signals for transmission by the antenna structure 62.

And the antenna structure 62 could comprise a plurality of antennas for communicating over the air interface. As discussed above, the base station could be configured to provide service on each of a plurality of carriers, and the carriers could cooperatively define a plurality of air-interface resources (e.g., PRBs) per unit time. Further, as noted above, the antenna structure could comprise or otherwise define an antenna array, such as a massive-MIMO array for instance.

Backhaul communication interface 52 could be a network communication interface (e.g., an Ethernet network interface port and/or connection) through which the base station can communicate with various other network entities.

And controller 54, which could comprise a processing unit, data storage, and program instructions stored in the data storage and executable by the processing unit, or could take other forms, could be operable to cause the base station to carry out various operations as described herein.

For example, the controller could be configured to schedule allocation of the air-interface resources for use to carry data wirelessly from the base station to devices served by the base station. Further, the controller could be configured to monitor an operational state of the base station and to make a determination of whether the base station is (i) serving at least a predefined threshold quantity of connected-mode devices and (ii) allocating at least a predefined threshold quantity of the air-interface resource per unit time. And when the determination is affirmative, the controller could cause the base station to operate with carrier-aggregation service disabled. Whereas, when the determination is negative, the controller could cause the base station to operate with carrier-aggregation service enabled.

Still further, as discussed above, the controller could condition this process on the base station operating with MU-MIMO service enabled. Thus, the controller could cause the base station to operate with carrier-aggregation service disabled when the determination is affirmative only if the base station also has MU-MIMO service enabled.

Other aspects described above could be implemented in this context as well, and vice versa.

Exemplary embodiments have been described above. Those skilled in the art will understand, however, that changes and modifications may be made to these embodiments without departing from the true scope and spirit of the invention.

We claim:

1. A method for controlling carrier-aggregation service by a base station, wherein the base station is configured to provide wireless communication service on each of a plurality of carriers, and wherein the carriers cooperatively define a plurality of air-interface resources per unit time, the method comprising:

detecting that the base station is operating in an operational state including (i) the base station serving at least a predefined threshold quantity of connected-mode devices, (ii) the base station allocating at least a predefined threshold quantity of the air-interface resources per unit time, and (iii) the base station having Multi-User Multiple-Input-Multiple-Output (MU-MIMO) service enabled; and responsive to detecting that the base station is operating in the operational state, disabling carrier-aggregation service by the base station, wherein disabling carrier-aggregation service by the base station comprises transitioning the base station from a first mode in which the base station is configured to invoke carrier-aggregation when a carrier-aggregation trigger condition exists to a second mode in which the base station is configured to not invoke carrier-aggregation even when the carrier-aggregation trigger condition exists.

2. The method of claim 1, carried out with respect to downlink service.

3. The method of claim 2, wherein the air-interface resources are downlink physical resource blocks (PRBs), wherein each carrier has a respective frequency bandwidth divided into a respective quantity of the downlink PRBs per unit time.

4. The method of claim 2, wherein the predefined threshold quantity of connected-mode devices is at least five, and wherein the predefined threshold quantity of the air-interface resources per unit time is at least 70% of the air-interface resources per downlink subframe.

5. The method of claim 1, wherein invoking carrier-aggregation comprises reconfiguring a connection between the base station and a served connected-mode device from encompassing just a single carrier to encompassing multiple carriers.

6. The method of claim 1, wherein disabling carrier-aggregation service by the base station further comprises discontinuing by the base station currently-configured carrier-aggregation service for one or more of the connected-mode devices.

7. The method of claim 6, wherein discontinuing by the base station the currently-configured carrier-aggregation service for the one or more connected-mode devices comprises, for each of the one or more connected-mode devices, limiting scheduled transmission from the base station to the connected-mode device to be on a primary component carrier of a connection between the base station and the connected-mode device.

8. The method of claim 6, wherein discontinuing by the base station the currently-configured carrier-aggregation service for the one or more connected-mode devices comprises, for each of the one or more connected-mode devices, reconfiguring a connection between the base station and the connected-mode device from encompassing multiple carriers to encompassing just a single carrier.

9. The method of claim 1, wherein transitioning the base station from the first mode to the second mode comprises storing in data storage of the base station an indication that the base station is operating in the second mode rather than in the first mode, wherein, per the indication, the base station does not invoke carrier-aggregation.

10. A method for controlling carrier-aggregation service by a base station, wherein the base station is configured to provide service on each of a plurality of carriers, and wherein the carriers cooperatively define a plurality of air-interface resources per unit time, the method comprising:

making a determination by the base station of whether the base station is operating in an operational state including (i) the base station serving at least a predefined threshold quantity of connected-mode devices, (ii) the base station allocating at least a predefined threshold quantity of the air-interface resources per unit time, and (iii) the base station having Multi-User Multiple-Input-Multiple-Output (MU-MIMO) service enabled; and controlling by the base station, based on the determination, whether the base station operates with carrier-aggregation service enabled or rather disabled, wherein the controlling includes (a) if the determination is that the base station is operating in the operational state, then, responsive to the determination, operating by the base station with carrier-aggregation service disabled and (b) if the determination is that the base station is not operating in the operational state, then, responsive to the determination, operating by the base station with carrier-aggregation service enabled.

11. The method of claim 10, wherein:
operating by the base station with carrier-aggregation service enabled comprises the base station being configured to invoke carrier-aggregation when a carrier-aggregation trigger condition exists, and
operating by the base station with carrier-aggregation service disabled comprises the base station being configured to not invoke carrier-aggregation service even when the carrier-aggregation-trigger condition exists.

12. The method of claim 10, carried out with respect to downlink service.

13. The method of claim 12, wherein the air-interface resources are downlink physical resource blocks (PRBs), wherein each carrier has a respective frequency bandwidth divided into a respective quantity of the downlink PRBs per unit time.

14. The method of claim 12, wherein the predefined threshold quantity of connected-mode devices is at least five, and wherein the predefined threshold quantity of air-interface resources per unit time is at least 70% of the air-interface resources per downlink subframe.

15. The method of claim 10, wherein the controlling further includes:
if the determination is that the base station is operating in the operational state, then, responsive to the determination, transitioning by the base station from operating with carrier-aggregation service enabled to operating with carrier-aggregation service disabled; and
if the determination is that the base station is not operating in the operational state, then, responsive to the determination, transitioning by the base station from operating with carrier-aggregation service disabled to operating with carrier-aggregation service enabled.

16. The method of claim 10, wherein the controlling further includes:
storing in data storage of the base station an indication of whether the base station is operating with carrier-aggregation service enabled or rather with carrier-aggregation service disabled, wherein the base station operates in accordance with the stored indication.

17. A base station operable to control carrier-aggregation service over an air-interface, the base station comprising:
an antenna array comprising a plurality of antennas for communicating over the air interface, wherein the base station is configured to provide service on each of a plurality of carriers, and wherein the carriers cooperatively define a plurality of air-interface resources per unit time; and
a controller configured to schedule allocation of the air-interface resources for use to carry data wirelessly from the base station to devices served by the base station,
wherein the controller is configured to monitor an operational state of the base station and to make a determination of whether the base station is (i) serving at least a predefined threshold quantity of connected-mode devices and (ii) allocating at least a predefined threshold quantity of the air-interface resources per unit time,
wherein, when the determination is affirmative, the controller causes the base station to operate with carrier-aggregation service disabled, and when the determination is negative, the controller causes the base station to operate with carrier-aggregation service enabled, and
wherein the controller causes the base station to operate with carrier-aggregation service disabled when the determination is affirmative only if the base station also has Multi-User Multiple-Input-Multiple-Output (MU-MIMO) service enabled.

* * * * *